United States Patent [19]

Hasegawa et al.

[11] Patent Number: 5,077,118

[45] Date of Patent: Dec. 31, 1991

[54] STAMPING FOIL

[75] Inventors: Kinji Hasegawa, Hachioji; Yuzuru Izumi; Yoji Murakami, both of Sagamihara, all of Japan

[73] Assignee: Teijin Limited, Osaka, Japan

[21] Appl. No.: 579,026

[22] Filed: Sep. 7, 1990

[30] Foreign Application Priority Data

Sep. 8, 1989 [JP] Japan ..................... 1-231382

[51] Int. Cl.$^5$ ..................... B32B 5/16

[52] U.S. Cl. ..................... 428/149; 428/331; 428/352; 428/914

[58] Field of Search ..................... 428/149, 331, 352

[56] References Cited

U.S. PATENT DOCUMENTS

| | | | |
|---|---|---|---|
| 4,084,032 | 4/1978 | Pasersky | 428/354 X |
| 4,275,116 | 6/1981 | Krätschmer et al. | 428/914 X |
| 4,348,446 | 9/1982 | Mitsuishi et al. | 428/149 X |
| 4,495,232 | 1/1985 | Bauser et al. | 428/347 X |
| 4,619,869 | 10/1986 | Kiriyama et al. | 428/480 |
| 4,693,932 | 9/1987 | Kuze et al. | 428/331 X |
| 4,868,049 | 9/1989 | Nelson | 428/344 X |
| 4,892,602 | 1/1990 | Oike et al. | 428/344 X |

FOREIGN PATENT DOCUMENTS

EP-A-029670 7/1987 European Pat. Off. .

OTHER PUBLICATIONS

World Patents Index, Acession No. 90-019529, Derwent Publications Ltd., London, England.
World Patents Index, Accession No. 89-204305, Derwent Publications Ltd., London, England.
World Patents Index, Accession No. 80-70237C, Derwent Publications Ltd., London, England.

*Primary Examiner*—George F. Lesmes
*Assistant Examiner*—D. R. Zirker
*Attorney, Agent, or Firm*—Wenderoth, Lind & Ponack

[57] ABSTRACT

A stamping foil comprising:

(a) a biaxially oriented polyester film containing as a first component from 0.01 to 0.5% by weight of spherical silica particles having an average particle diameter of from 0.03 μm and smaller 0.3 μm and a particle diameter ratio defined as a ratio of long diameter/short diameter of from 1.0 to 1.2, and as a second component from 0.002 to 0.2% by weight of spherical silica particles having an average particle diameter of from 0.6 to 3 μm and a particle diameter ratio defined as a ratio of long diameter/short diameter of from 1.0 to 1.2, provided that the content of said second component is the same as or less than the content of said first component, (b) a release layer provided on one surface of said biaxially oriented polyester film (a), and (c) a cover layer provided on siad release layer (b).

4 Claims, 1 Drawing Sheet

STAMPING FOIL

The present invention relates to a stamping foil. More particularly, the present invention relates to a stamping foil which comprises as a base component a biaxially oriented polyester film being highly transparent and having excellent evenness, smoothness and slip characteristics and have excellent luster, rolled up appearance and processability.

Stamping foils are useful for stamping metallic color patterns or letters on various objects such as plastics formed articles, leather, wood products, paper products and the like to endow them with attractive appearance and increase their commercial value.

The attached drawings illustrate generally stamping foils, in which.

Figure 1:
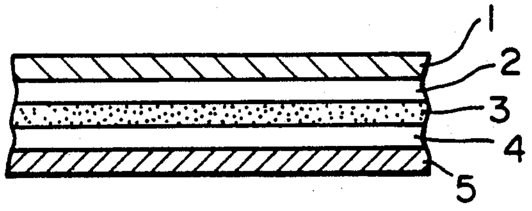
FIG. 1 is a cross section illustrating a basic construction of a stamping foil.
Figure 2:
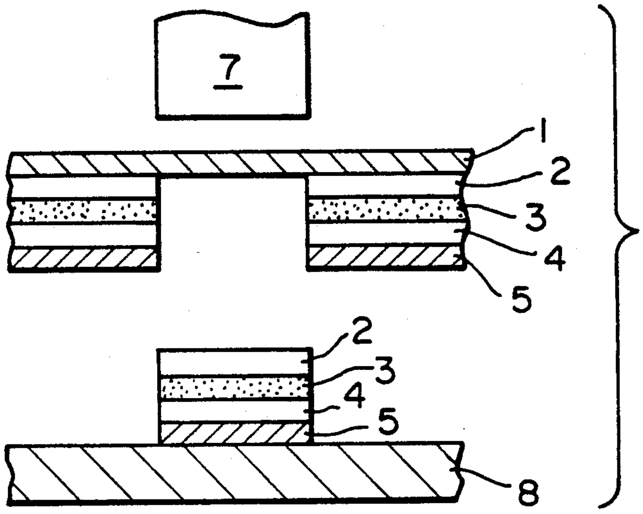
FIG. 2 is a schematic illustration of printing using a stamping foil.

As illustrated in FIG. 1, stamping foils usually comprise a base film 1 having laminated thereon a release layer 2, a pigmented layer 3, a light reflecting layer (metalized layer) 4, and an adhesive layer 5. When the stamping foil is superimposed on an object to be printed so that the surface of the adhesive layer 5 of the stamping foil contacts the object 8, and is pressed on the side of the base film by a mold 7 which has been heated in advance, as illustrated in FIG. 2, the adhesive in a portion of the foil exactly facing the mold is molten and thus the foil adheres at that portion. Upon removing the mold and the stamping foil from the object, the portion that was pressed by the hot mold is peeled off from the base film, and the layers laminated are stamped or printed on the object. In view of decorative effects, aesthetic effects and the like that printing would have, it is desirable that printed articles have excellent luster; for this purpose it is desirable that the light reflecting layer be as even and smooth as possible. The light reflecting layer is provided on the surface of the base film which has already been coated with a release layer and a pigmented layer. That is, the light reflecting layer is applied to the base film through the release layer and the pigmented layer, which layers are so thin that surface roughness of the base film is transferred to the coated surface almost as it is. Therefore, in order to make the light reflecting layer even and smooth, it is necessary to make the surface of the base film even and smooth.

Figure 3:
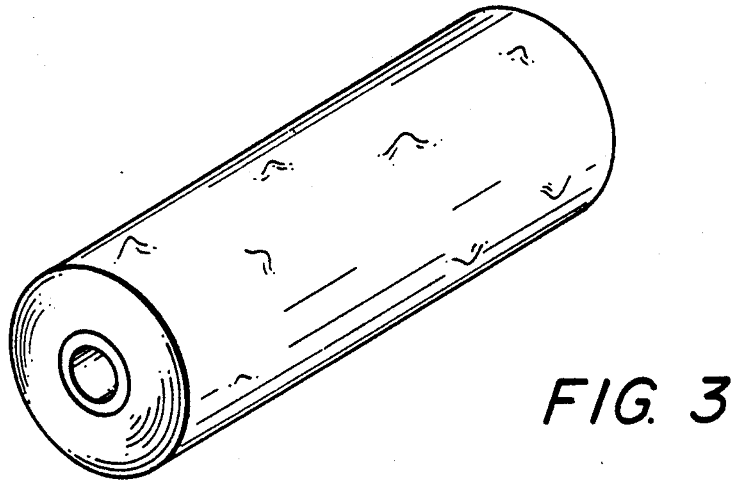
FIG. 3 is a schematic perspective view of a roll of a film having poor slip characteristics showing the occurrence of knob-like protrusions when the film is rolled up.

However, a base film whose surface has made even and smooth has poor slip characteristics, resulting in that the rolled-up appearance of the film grows worse while it is being processed into a stamping foil. In addition, when a film having insufficient slip characteristics is rolled up on a roll, knob-like protrusions appear on it as illustrated in FIG. 3 and coating layers on it tend to be damaged or peeled off, resulting in that the resulting stamping foil has some defects.

Therefore, there have been conventionally produced stamping foils using a base film having a surface roughened to a certain extent, the luster of the stamping films on this occasion being sacrificed.

While there is a keen desire to further improve the luster of stamping foils, there have also been recent trends in which the productivity of stamping foils becomes increasingly high, which lead to producing stamping films of larger widths at higher roll-up speeds. The use of a higher roll-up speed and a larger film width causes a problem that it is increasingly difficult to obtain film rolls which have good rolled-up appearance.

More specifically, defects of the rolled-up appearance of a film roll are grouped into (1) the occurrence of knob-like protrusions in the roll, (2) the occurrence of creases in the film in its longitudinal direction, (3) irregular end faces of the film, and the like. The defect (1) tends to occur when the film has insufficient slip characteristics. The defect (2) is frequently observed when the film is rolled up at a high tension in order to prevent the occurrence of the knoblike protrusions. The defect (3) tends to occur when air layers which are formed at the time of rolling up an even film slightly leak out, scarcely.

Accordingly, polyester films to be used as a base film must have not only excellent evenness and smoothness but also excellent slip characteristics and air leaking property in order to obtain good rolled-up appearance of the film. Particularly, the better the required air leaking property is, the higher is the film roll-up speed and the larger is the width of the film to be rolled up.

As for the processes for improving the slip characteristics of films, there have been proposed a process in which particles of an inorganic substance such as silicon oxide or calcium carbonate are added to a polyester, and a process in which fine particles containing calcium, lithium or phosphorus are deposited in the polymerization system when a polyester is synthesized. In both processes, the slip characteristics of films are improved as a result of the formation of protrusions on surfaces of the films due to the fine particles upon film formation of the polyester.

However, in the process in which the slip characteristics of films are improved by the formation of protrusions due to the fine particles as described above, it is usually the case that the more the surfaces of the films are roughened the more the slip characteristics of the films are improved while the worse the luster of the light reflecting layer of the stamping foil becomes.

As one measure to balance the evenness, slip characteristics and air leaking property which are contradictory to each other, there have been proposed many means for utilizing composite inorganic particles which include particles of larger particle diameters and particles of smaller particle diameters. However, these means also have some problems and they are difficult as they are to satisfy both the luster of the light reflecting layer and slip characteristics at the same time. The reasons for this are that among the composite inorganic particles those particles with larger particle diameters have sizes which are coarser than what is required for high grade quality; the larger the particle diameters of the particles the higher the protrusions on the surfaces of the films are so that the luster of the light reflecting layer becomes worse; the use of particles of larger particle diameters makes the protrusions on the surfaces of the films higher and voids around the particles greater so that film haze due to the voids increases, and the like.

Therefore, an object of the present invention is to solve the above-described problems by providing a stamping foil which comprises a highly transparent biaxially oriented polyester film having excellent evenness, smoothness and slip characteristics as a base material and which has excellent luster, rolled-up appearance and processability.

With a view to developing a stamping foil of a high grade quality which can achieve the object of the present invention, the present inventors have made extensive investigations, and as a result they have now found that when the shape of the protrusions on the surface of base film is made sharp and the larger particles of a predetermined larger particle diameter and the smaller particles of a predetermined smaller particle diameter are used in combination in a predetermined proportion, the slip characteristics, air leaking property and transparency of the film are improved greatly even if the surface of the film is even; that in order to make the shape of the protrusions sharp, the particles which are present in the film are most preferably spherical; and that it is necessary to select spherical silica particles from among numerous known materials including glass beads as well and use them as spherical particles in order to obtain a stamping foil which satisfies the above-described characteristics.

Therefore, according to the present invention, there is provided a stamping foil comprising:

(a) a biaxially oriented polyester film containing as a first component from 0.01 to 0.5% by weight of spherical silica particles having an average particle diameter of from 0.03 μm to less than 0.3 μm and a particle diameter ratio defined as a ratio of long diameter/short diameter of from 1.0 to 1.2, and as a second component from 0.002 to 0.2% by weight of spherical silica particles having an average particle diameter of from 0.6 to 3 μm and a particle diameter ratio defined as a ratio of long diameter/short diameter of from 1.0 to 1.2, provided that the content of the second component is the same as or less than the content of the first component, (b) a release layer provided on one surface of the biaxially oriented polyester film (a), and (c) a cover layer provided on the release layer (b).

The polyester used in the present invention is a polyester comprising an aromatic dicarboxylic acid as a main acid component and an aliphatic glycol as a main glycol component. This type of polyester is substantially linear and has a film-forming property, particularly a film-forming property by melt forming. As for the aromatic dicarboxylic acid, there can be cited, for example, terephthalic acid, naphthalenedicarboxylic acid, isophthalic acid, diphenoxyethanedicarboxylic acid, diphenyldicarboxylic acid, diphenyl-ether-dicarboxylic acid, diphenylsulfonedicarboxylic acid, diphenyl-ketonedicarboxylic acid, anthracenedicarboxylic acid, etc. As for the aliphatic glycol, there can be cited, for example, polymethylene glycols having from 2 to 10 carbon atoms such as ethylene glycol, trimethylene glycol, tetramethylene glycol, pentamethylene glycol, hexamethylene glycol, and decamethylene glycol; and alicyclic diols such as cyclohexanedimethanol.

Examples of the polyester which are used preferably in the present invention are, for example, those polyesters which comprises an alkylene terephthalate and/or alkylene naphthalate as a main component. Particularly preferred polyesters are those copolymers which comprise terephthalic acid and/or 2,6-naphthalenedicarboxylic acid in an amount of no less than 80% by mole based on the total amount of the dicarboxylic acid component and ethylene glycol in an amount of no less than 80% by mole based on total amount of the glycol component, not to mention polyethylene terephthalate and polyethylene-2,6-naphthalate. No more than 20% by mole of the dicarboxylic acid component based on the total amount of the acid component may be one or more of the above-described aromatic dicarboxylic acids other than terephthalic acid and/or 2,6-naphthalenedicarboxylic acid, or aliphathic dicarboxylic acids such as adipic acid, and sebacic acid; alicyclic dicarboxylic acids such as cyclohexane-1,4-dicarboxylic acid. No more than 20% by mole of the total glycol component may be one or more of the abovedescribed glycols other than ethylene glycol, or aromatic diols such as hydroquinone, resorcin, and 2,2-bis(4-hydroxyphenyl)propane; aromatic ring-containing aliphatic diols such as 1,4-dihydroxymethylbenzene; polyalkylene glycol (polyoxyalkylene glycol) such as polyethylene glycol, polypropylene glycol, and polytetramethylene glycol.

The polyester which can be used in the present invention includes those polyesters in which a component derived from a hydroxycarboxylic acid (for example, aromatic hydroxycarboxylic acids such as hydroxybenzoic acid, aliphatic hydroxycarboxylic acids such as hydroxycaproic acid) is present in an amount of no more than 20% by mole based on the sum of the dicarboxylic acid component and hydroxycarboxylic acid component, in a copolymerized or bonded state.

The polyester used in the present invention may further include those polyesters which comprise as a comonomer a trifunctional or more polycarboxylic acid or polyhydroxyl compound (for example, trimellitic acid, pentaerythritol, etc.) in an amount such that the polyester is substantially linear, for example, in an amount of no more than 2% by mole based on the total acid components.

The above-described polyesters are known per se and can be produced by conventional processes.

As for the polyester, one which has an intrinsic viscosity of from about 0.4 to 0.8 measured at 35° C. as a solution in o-chlorophenol is preferred.

The biaxially oriented polyester film of the present invention has a number of minute protrusions on its surfaces. The minute protrusions are derived from a number of spherical silica particles dispersed in the polyester.

The polyester having dispersed therein spherical silica particles can be produced by adding spherical silica particles (preferably as a slurry in a glycol) in a reaction mixture usually at the time of reaction for the preparation of a polyester, for example, at any desired time during interesterification reaction or polycondensation reaction when it is prepared by an interesterification process, or at any desired time when it is prepared by a direct polymerization process. Particularly, it is preferred to add the spherical particles to the reaction system in an initial stage of the polycondensation reaction, for example in a stage before the intrinsic viscosity reaches about 0.3.

The spherical silica particles dispersed in the polyester of the present invention have a particle diameter ratio defined as a ratio of long diameter/short diameter of from 1.0 to 1.2, preferably from 1.0 to 1.1, and more preferably from 1.0 to 1.05. The spherical silica particles individually have a shape which is very close to a true sphere. Such spherical silica particles are drastically different from conventional silica particles known as a lubricant which are ultrafine bulk particles having a particle diameter of about 10 nm or agglomerate particles having a particle diameter of about 0.5 μm formed by the agglomeration of the ultrafine bulk particles. If the particle diameter ratio of the spherical silica particles is too large, void ratio is also too large to give a transparent polyester film. The spherical silica particles comprise two components, i.e., those particles having an average particle diameter of from 0.03 μm to less than 0.3 μm, preferably from 0.05 μm to less than 0.3 μm, and more preferably from 0.1 μm to less than 0.2 μm (first component), and those particles having an average particle diameter of from 0.6 to 3.0 μm, preferably from 0.8 to 2.5 μm, and more preferably from 1.0 to 2.5 μm (second component). If the average particle diameter of the first component particles is too small, the effect of improving the slip characteristics is insufficient, which is undesirable, while if it is too large, the difference from the average particle diameter of the second component particles is small so that air particles is small so that air leaking property becomes worse and the effect of improving rolled-up appearance (prevention of irregular end faces) is insufficient, which is also undesirable. Also, too large an average particle diameter of the second component particles is undesirable because surface evenness becomes insufficient and the luster of the resulting stamping foil becomes worse.

The difference in average particle diameter between the first and second component particles is preferably no smaller than 0.6 μm, more preferably no smaller than 0.8 μm, and most preferably no smaller than 0.9 μm. If the difference in average particle diameter is smaller, the air leaking property becomes worse and end faces of films tend to become irregular or slip out when wide films are rolled up at high roll up speed, thus making the rolled-up appearance of films worse. Thus too small a difference in average particle diameter is undesirable.

The average particle diameter and particle diameter ratio of the spherical silica particles are obtained by depositing a metal by vapor deposition on the surfaces of the particles of the lubricant, taking an electron micrograph of the particles at a magnification or from X10,000 to X30,000 and measuring long diameters, short diameters and diameters of projected area circles of the images of the particles in the electron micrograph, and applying the values thus obtained to the following equation to calculate both parameters.

$$\text{Average particle diameter} = \frac{\text{Sum of diameters of projected area circles of particles}}{\text{Number of particles measured}}$$

$$\text{Particle diameter ratio} = \frac{\text{Average long diameter of particles}}{\text{Average short diameter of particles}}$$

It is preferred that the spherical lubricant particles have a sharp particle diameter distribution and more preferably have a relative standard deviation of no greater than 0.5, and particularly no greater than 0.3.

The realtive standard deviation is expressed by the following formula:

$$\text{Relative standard deviation} = \frac{\sqrt{\dfrac{\sum_{i=1}^{n}((Di - D)^2)}{n}}}{D}$$

where the symbols have the following meanings:

Di: diameter of projected area circle of each particle (μm)

$\overline{D}$: average of diameters of projected area circles $$\left( = \frac{\sum_{i=1}^{n} Di}{n} \right)(\mu m), \text{ and}$$

n: number of particles

When the spherical silica particles used have a relative standard deviation of 0.5 or less, the distribution of protrusions formed on the film surface is highly uniform because the particles have a shape of a true sphere and a sharp particle size distribution, so that a polyester film can be obtained whose protrusions have a uniform height and which has excellent slip characteristics.

In addition, it is preferred that the particle size distribution of the first component particles and that of the second component particles do not overlap each other.

The spherical silica particles are not limited particularly with respect to the process for their production and other conditions so far as they satisfy the abovedescribed conditions. For example, the spherical silica particles can be produced by hydrolyzing ethyl orthosilicate ($Si(OC_2H_5)_4$ to form monodispersed spheres of hydrous silica $Si(OH)_4$, dehydrating the monodispersed spheres of the hydrous silica to cause silica bonds (≡Si-O-Si≡) to grow three-dimensionally (cf. Bullettin of Japan Chemical Society, 1981 No. 9, p. 1503).

$$Si(OC_2H_5)_4 + 4H_2O \rightarrow Si(OH)_4 + 4C_2H_5OH$$

$$\equiv Si\text{-}OH + HO\text{-}Si\equiv \rightarrow \equiv Si\text{-}O\text{-}Si\equiv + H_2O$$

The amount of the spherical silica particles as the first component is from 0.01 to 0.5% by weight, preferably from 0.02 to 0.3% by weight, more preferably from 0.05 to 0.2% by weight, and most preferably from 0.05 to 0.15% by weight, based on the weight of the polyester. On the other hand, the amount of the spherical silica particles as the second component is in a range of from 0.002 to 0.2% by weight, preferably from 0.005 to 0.1% by weight, more preferably from 0.01 to 0.07% by weight, and most preferably from 0.01 to 0.05% by weight, based on the weight of the polyester, provided that it is the same as or preferably smaller than the amount of the spherical silica particles as the first component. In the amount of the first component particles is smaller than 0.01% by weight and that of the second component particles is smaller than 0.002% by weight, the effects of improving slip characteristics and resistance to scraping are insufficient. Furthermore, the total amount of the first and second component particles is usually from 0.012 to 0.7% by weight, preferably from 0.025 to 0.4% by weight, more preferably from 0.06 to 0.27% by weight, and most preferably from 0.06 to 0.2% by weight, based on the weight of the polyester. If the total amount is too large, the transparency of the film decreases and its haze increases, resulting in that the stamping foil obtained has a poor luster. Thus, too large a total amount of the first and second component particles is undesirable.

The polyester film used in the present invention can be produced in a manner similar to a conventional process for producing biaxially oriented films. For example, it can be produced by melting a polyester containing a predetermined amount of spherical silica particles and film-forming the polyester to obtain an amorphous unoriented film, biaxially orienting the unoriented film, and thermally setting the biaxially oriented film. On this occasion, surface characteristics of the film vary depending on the particle diameter and amount of the spherical silica particles as well as the conditions of orientation, and therefore, it is necessary to select conditions of orientation appropriately. For example, as for orientation temperature, good results are obtained by selecting a first step orientation temperature (for example, longitudinal orientation temperature: $T_1$) from a range of from $(Tg-10)$ to $(Tg+45)°$ C. (where Tg is a glass transition point of the polyester) and a second step orientation temperature (for example, transverse orientation temperature: $T_2$) from a range of from $(T_1+5)$ to $(T_1+40)°$ C. As for orientation ratio, uniaxial orientation ratio may be selected from a range of no lower than 2.5 times, and preferably no lower than 3 times the original, and area ratio from a range of no lower than 8 times, and preferably no lower than 10 times the original. Furthermore, thermal setting temperature may be selected from a range of from 180° to 250° C., and preferably from 200° to 240° C. Thermal setting time may be selected from a range of from 1 to 30 seconds.

The thickness of the biaxially oriented polyester film is preferably from 3 to 100 μm, more preferably from 4 to 40 μm, and most preferably from 8 to 25 μm.

The biaxially oriented polyester film used in the present invention has a feature that it contains fewer voids than conventional ones, and light scattering due to voids is suppressed to a very low level, thus having excellent transparency.

The reason why voids around spherical silica particles are small is supposed to be that the spherical silica particles have good affinity for the polyester, and that because the particles are very close to true spheres stress around the particles is transferred uniformly at the time of orientation so that concentration of stress at a part of interface between the polyester and the particles can be avoided.

Because the polyester contains spherical silica particles having sharp particle diameter distributions, the distribution of protrusions formed on the surface of the polyester film is highly uniform, and therefore a polyester film can be obtained in which large and small protrusions, respectively, have uniform heights. Therefore, the biaxially oriented polyester film used in the present invention is characterized that it has uniform depression-and-protrusion surface characteristics, excellent slip characteristics and high transparency.

The biaxially oriented polyester film used in the present invention may undergo adhesion facilitating treatment such as coating of an adhesion facilitating layer, corona discharge, etc. The biaxially oriented polyester film may contain a third component such as an antistatic agent, a UV adsorbent, or a colorant.

The stamping foil of the present invention is constructed by providing a release layer on one surface of the above-described biaxially oriented polyester film, and further providing thereon (on the outer side thereof) cover layers such as a light reflecting layer and an adhesive layer. Here, by the term "outer side" is meant a side which is opposite to the cover layer with respect to the base film element. "Cover layers" includes a pigmented layer, a light reflecting layer and an adhesive layer. In the stamping foil of the present invention, the light reflecting layer and adhesive layer are indispensable component layers.

The stamping foil of the present invention may be provided with a pigmented layer between the release layer and the light reflecting layer, if desired. When the pigmented layer is provided, the latter is preferably provided on the outer side.

The release layer is provided in order to make it easy to peel off the light reflecting layer, adhesive layer, etc. from the biaxially oriented polyester film (base film) at the time of printing. As for the release layer, any known material for release layer can be used. For example, the release layer can be formed by dissolving wax, synthetic dry oil and cellulose derivative resin (e.g., nitrocellulose, cellulose acetate butyrate, etc.) in a solvent and coating the resulting solution, followed by evaporating the solvent.

The pigmented layer is provided for coloring printed matter. This layer can be formed by dispersing or dissolving a dyestuff, a pigment or the like in a binder. As for the binder, polymers which can be used as a protective layer are used frequently.

In many cases, the light reflecting layer is a deposited layer of a metal. However, it may also be a deposited layer of a metal oxide or it may be formed by chemical plating.

The adhesive layer is provided so that only those parts that have been pressed by a mold or stamp can be bonded to a material to be printed. Any type of heat-sensitive adhesive such as vinyl acetate type, vinyl chloride type or acrylic type ones may be used.

Because it uses the oriented polyester film containing the above-described type of spherical silica particles, the stamping foil of the present invention has features that it has an excellent processability and the resulting printed matter has an excellent luster.

Hereafter, the present invention will be explained in greater detail with reference to non-limitative examples. In the examples and comparative examples, various physical properties and characteristics were measured as follows.

(1) Particle diameter of spherical silica particles (i) Measurement on powder particles Powder was scattered on a stage for mounting samples of an electron microscope in such a manner that respective particles did not overlap each other as far as possible and a deposited gold film was formed on surfaces of the particles (film thickness: 200 to 300 Å) using a gold sputter. The particles were observed under a scanning type electron microscope at a magnification of, for example, from X10,000 to X30,000. Then, 100 particles were selected and their respective long diameters (Dli), short diameters (Dsi) and diameters of projected area circles (Di) were obtained. The values obtained were applied to the following formulae to calculate average values which were defined as long diameter (Dl), short diameter (Ds) and average particle diameter ($\bar{D}$).

$$D1 = \frac{\sum_{i=1}^{n} D1i}{n} \; (\mu m),$$

$$Ds = \frac{\sum_{i=1}^{n} Dsi}{n} \; (\mu m) \text{ and}$$

$$D = \frac{\sum_{i=1}^{n} Di}{n} \; (\mu m)$$

(ii) Measurement on particles in a film

Small pieces of a sample film were fixed on a stage for mounting samples of a scanning type electron microscope and ion etching treatment was performed on surfaces of the film using a sputtering apparatus manufactured by Nippon Electronics Co., Ltd. (JFC-1100 type ion sputtering apparatus). The treatment was practiced by placing the samples in a bell jar, evacuating the inside of the bell jar to a vacuum degree of about $10^{-3}$ Torr. and applying electric current of 12.5 mA at a voltage of 0.25 kV for 10 minutes. In addition, using the same apparatus as above, gold sputtering was performed on surfaces of the film, and the films were observed using a scanning type electron microscope at a magnification of from X10,000 to X30,000. Using Ruzex 500 manufactured by Nippon Regular Co., Ltd., at least 100 particles were determined for their respective long diameters (Dli), short diameter (Dsi) and diameters of projected area circles (Di). Then, the same procedures as in (i) above were repeated.

(2) Surface roughness (Ra) of a film

Values defined by JIS-B0601 were measured as center line average roughness using a needle type surface roughness tester manufactured by Kosaka Institute Co., Ltd. (SURFCORDER SE-30C). The conditions under which the measurement was conducted are as follows.

(a) Radius of needle tip: 2 μm (b) Measurement pressure: 30 μm (c) Cut-Off: 0.25 mm (d) Measurement length 0.5 mm (e) Data processing The same sample was measured 5 times repeatedly. The largest value was excluded and an average of the remaining 4 measurements was found and the average obtained was rounded to three decimals.

(3) Rolled-up appearance:

A release layer and a protective layer were provided on a film having a width of 500 mm and a length of 2,000 m, and the film was rolled up on a roll. The appearance of the rolled-up film was examined in detail, and the number of knob-like protrusions as schematically illustrated in FIG. 3 and having a long diameter of 1 mm or more was counted. The rating was as follows.

| Number of protrusions | Grade |
|---|---|
| 0 | 1 |
| 1 to 2 | 2 |
| 3 to 5 | 3 |
| 6 to 10 | 4 (unacceptable) |
| 11 to more | 5 (unacceptable) |

(4) Luster

The luster of surfaces printed with a stamping foil were judged visually and the results obtained were indicated as follows.

Rough touching was observed: X

Slight rough touching was observed: Δ

No rough touching was observed: ○

Examples 1 to 9 and Comparative Examples 1 to 5

Polyethylene terephthalate was prepared by a conventional manner using dimethyl terephthalate and ethylene glycol as raw materials, manganese acetate as an interesterification catalyst, antimony trioxide as a polymerization catalyst and phosphorous acid as a stabilizer. On this occasion, particles of a lubricant described in Table 1 were added in a form of dispersion in ethylene glycol so that the lubricant was contained in the polymer in a predetermined amount shown in Table 2.

The polyethylene terephthalate thus obtained was dried, melt-extruded by a conventional manner to form a film. The film was biaxially stretched at a temperature of from 90° to 120° C. at a longitudinal stretching ratio of 3.5 times and a transverse stretching ratio of 3.7 times the original dimension, and the biaxially stretched film was thermally fixed at 220° C. to obtain a biaxially oriented film of a film thickness of 12 μm.

On one surface of the resulting film cellulose acetate butyrate was coated to a thickness of 5 μm to form a release layer. Then, the film was rolled up on a roll and subjected to judgement of rolled-up appearance. Next, aluminum was deposited on the peel-off layer of the film to a thickness of about 300 Å to form a light reflecting layer, and further a heat-sensitive adhesive of vinyl acetate type was coated on the aluminum layer to form an adhesive layer. The stamping foil thus prepared was subjected to printing of ABS molded plates. The results obtained are shown in Table 2.

The portions of the above-described rolled-up film where knob-like protrusions were revealed correspond to defective portions of the stamping foil where it was impossible to perform normal printing.

From the results, it follows that the stamping foils of the examples had excellent luster and rolled-up appearance in contrast to the stamping foils of the comparative examples which had poor rolled-up appearance (grade 5) in spite of acceptable luster, or poor luster in spite of acceptable rolled-up appearance.

TABLE 1

| | Particles Added | | | | | | | |
|---|---|---|---|---|---|---|---|---|
| | First Component Particle | | | | Second Component Particle | | | |
| | Type of Particle | Average Particle Diameter (μm) | Relative Standard Deviation (δ/D) | Particle Diameter Ratio | Type of Particle | Average Particle Diameter (μm) | Relative Standard Deviation (δ/D) | Particle Diameter Ratio |
| Example 1 | Spherical Silica | 0.10 | 0.06 | 1.07 | Spherical Silica | 3.0 | 0.25 | 1.16 |
| Example 2 | " | " | " | " | " | 2.5 | 0.2 | 1.14 |
| Example 3 | " | " | " | " | " | 2.0 | 0.18 | 1.15 |
| Example 4 | " | " | " | " | " | 1.5 | 0.18 | 1.18 |

TABLE 1-continued

| | Particles Added | | | | | | | |
|---|---|---|---|---|---|---|---|---|
| | First Component Particle | | | | Second Component Particle | | | |
| | Type of Particle | Average Particle Diameter (μm) | Relative Standard Deviation (δ/D) | Particle Diameter Ratio | Type of Particle | Average Particle Diameter (μm) | Relative Standard Deviation (δ/D) | Particle Diameter Ratio |
| Example 5 | " | " | " | " | " | 1.0 | 0.17 | 1.17 |
| Example 6 | " | 0.20 | 0.07 | 1.06 | " | 1.5 | 0.18 | 1.18 |
| Example 7 | " | 0.25 | 0.08 | 1.07 | " | " | " | " |
| Example 8 | " | 0.10 | 0.06 | " | " | " | " | " |
| Example 9 | " | " | " | " | " | " | " | " |
| Comparative Example 1 | Spherical Silica | 0.025 | 0.08 | 1.07 | Spherical Silica | 1.5 | 0.18 | 1.18 |
| Comparative Example 2 | " | " | " | " | " | 3.5 | 0.25 | 1.18 |
| Comparative Example 3 | " | 0.3 | 0.06 | 1.06 | " | 1.5 | 0.18 | 1.18 |
| Comparative Example 4 | Kaolin | 0.65 | 0.8 | 8 | — | — | — | — |
| Comparative Example 5 | Bulk Silica | 2.5 | 1.5 | 1.9 | — | — | — | — |

TABLE 2

| | Particle Added (First Component/ Second Component) | Average Particle Diameter (First Component/ Second Component) (μm) | Amount (First Component/ Second Component) (weight %) | Rolled-up Appearance | Luster | Film Haze (%) | General* Evaluation |
|---|---|---|---|---|---|---|---|
| Example 1 | Spherical silica/ Spherical silica | 0.10/3.0 | 0.2/0.005 | 1 | Δ | 2.1 | ○ |
| Example 2 | Spherical silica/ Spherical silica | 0.10/2.5 | 0.2/0.007 | 2 | Δ | 2.0 | ○ |
| Example 3 | Spherical silica/ Spherical silica | 0.10/2.0 | 0.2/0.01 | 1 | Δ | 2.0 | ○ |
| Example 4 | Spherical silica/ Spherical silica | 0.10/1.5 | 0.2/0.02 | 1 | ○ | 2.3 | ○ |
| Example 5 | Spherical silica/ Spherical silica | 0.10/1.0 | 0.2/0.05 | 1 | ○ | 3.0 | ○ |
| Example 6 | Spherical silica/ Spherical silica | 0.20/1.5 | 0.2/0.05 | 3 | ○ | 2.8 | ○ |
| Example 7 | Spherical silica/ Spherical silica | 0.25/1.5 | 0.1/0.007 | 3 | ○ | 2.9 | ○ |
| Example 8 | Spherical silica/ Spherical silica | 0.10/1.5 | 0.1/0.02 | 1 | ○ | 2.2 | ○ |
| Example 9 | Spherical silica/ Spherical silica | 0.10/1.5 | 0.1/0.05 | 1 | Δ | 3.0 | ○ |
| Comparative Example 1 | Spherical silica/ Spherical silica | 0.025/1.5 | 0.1/0.03 | 5 | ○ | 3.0 | X |
| Comparative Example 2 | Spherical silica/ Spherical silica | 0.025/3.5 | 0.1/0.005 | 4 | X | 1.9 | X |
| Comparative Example 3 | Spherical silica/ Spherical silica | 0.3/1.5 | 0.1/0.03 | 2 | X | 3.3 | X |
| Comparative Example 4 | Kaolin/ Spherical silica | 0.65/— | 0.125 | 4 | ○ | 4.5 | X |
| Comparative Example 5 | Bulk silica/ Spherical silica | 3.5/— | 0.05 | 1 | ○ | 3.8 | X |

What is claimed is:

1. A stamping foil comprising:

(a) a biaxially oriented polyester film having on its surface a number of minute protrusions which are derived from a number of spherical silica particles, said film containing as a first component from 0.01 to 0.5% by weight of spherical silica particles having an average particle diameter of from 0.03 μm to less than 0.3 μm and a particle diameter ratio defined as a ratio of long diameter/short diameter of from 1.0 to 1.2, and as a second component from 0.002 to 0.2% by weight of spherical silica particles having an average particle diameter of from 0.6 to 3 μm and a particle diameter ratio defined as a ratio of long diameter/short diameter of from 1.0 to 1.2, provided that the content of said second component is the same as or less than the content of said first component, (b) a release layer provided on one surface of said biaxially oriented polyester film, and (c) a cover layer provided on said release layer, said cover layer comprising a light reflecting layer and a heatsensitive adhesive layer, said adhesive layer being an outermost layer.

2. A stamping foil as claimed in claim 1, wherein said spherical silica particles, have a relative standard deviation defined by following formula of no greater than 0.5;

$$\text{Relative standard deviation} = \frac{\sqrt{\dfrac{\sum_{i=1}^{n} ((Di - D)^2)}{n}}}{D}$$

where the symbols have the following meanings:

Di: diameter of projected area circle of each particle (μm)

D$\overline{D}$: average of diameters of projected area circles $$\left( = \frac{\sum_{i=1}^{n} Di}{n} \right)(\mu m), \text{ and}$$

n: number of particles.

3. A stamping foil as claimed in claim 2, wherein said cover layer comprises a pigmented layer, a light reflecting layer and an adhesive layer laminated in this order.

4. A stamping foil as claimed in claim 1, wherein said cover layer (c) further comprises a pigmented layer which is laminated on the release layer (b).

* * * * *